United States Patent
Iwamura et al.

(10) Patent No.: US 8,301,143 B2
(45) Date of Patent: Oct. 30, 2012

(54) MOBILE STATION AND MOBILE COMMUNICATION METHOD

(75) Inventors: Mikio Iwamura, Tokyo (JP); Hiroyuki Ishii, Yokohama (JP); Kenichiro Aoyagi, Yokosuka (JP); Hiroaki Yamagishi, Yokohama (JP); Naoto Okubo, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/148,569

(22) PCT Filed: Feb. 8, 2010

(86) PCT No.: PCT/JP2010/051773
§ 371 (c)(1),
(2), (4) Date: Oct. 3, 2011

(87) PCT Pub. No.: WO2010/090308
PCT Pub. Date: Aug. 12, 2010

(65) Prior Publication Data
US 2012/0028641 A1 Feb. 2, 2012

(30) Foreign Application Priority Data
Feb. 9, 2009 (JP) ................. 2009-027935

(51) Int. Cl.
*H04W 4/00* (2009.01)
(52) U.S. Cl. ............... 455/435.3; 455/432.1; 455/435.2; 455/432.3; 455/436
(58) Field of Classification Search ............... 455/435.3, 455/432.1, 435.2, 432.3, 436
See application file for complete search history.

(56) References Cited

U.S. PATENT DOCUMENTS

2008/0268843 A1* 10/2008 Ore et al. ............... 455/435.3
2010/0197310 A1* 8/2010 Jung et al. ............... 455/436

OTHER PUBLICATIONS

3GPP TS 25.304 V8.4.0, Dec. 2008, "3rd Generation Partnership Project; Technical Specification Group Radio Access Network; User Equipment (UE) procedures in idle mode and procedures for cell reselection in connected mode (Release 8)," (p. 1 and pp. 21-33), 14 pages.
NTT Docomo, Inc., "A potential problem with dedicated cell reselection priorities," 3GPP TSG-RAN WG2 #65, Tdoc R2-091519, Feb. 9-13, 2009, 5 pages.

(Continued)

*Primary Examiner* — Anthony Addy
*Assistant Examiner* — Manpreet Matharu
(74) *Attorney, Agent, or Firm* — Osha Liang LLP

(57) ABSTRACT

A mobile station according to the present invention includes: a dedicated signaling reception unit (12) configured to receive a dedicated signaling including a priority for a frequency or a group of frequencies of each radio access network; and a camp-on processing unit (13) configured to select a camp-on cell based on the priority or a radio quality in each cell, wherein when a predetermined flag is set to the dedicated signaling received by the dedicated signaling reception unit (12), the camp-on processing unit (13) is configured to select the camp-on cell based on the radio quality in each cell, from a plurality of cells that use a different frequency but reside within an identical radio access network, and to select the camp-on cell based on the priority included in the dedicated signaling, from a plurality of cells within a different radio access network.

18 Claims, 3 Drawing Sheets

OTHER PUBLICATIONS

3GPP TS 25.304 V8.5.0, Mar. 2009, "3rd Generation Partnership Project; Technical Specification Group Radio Access Network; User Equipment (UE) procedures in idle mode and procedures for cell reselection in connected mode (Release 8)," 48 pages.

3GPP TS 25.331 V8.5.0, Dec. 2008, "3rd Generation Partnership Project; Technical Specification Group Radio Access Network; Radio Resource Control (RRC); Protocol Specification (Release 8)," 1646 pages.

3GPP TS 36.304 V8.5.0, Mar. 2009, "3rd Generation Partnership Project; Technical Specification Group Radio Access Network; Evolved Universal Terrestrial Radio Access (E-UTRA); User Equipment (UE) procedures in idle mode (Release 8)," 30 pages.

3GPP TS 36.331 V8.5.0, Mar. 2009, "3rd Generation Partnership Project; Technical Specification Group Radio Access Network; Evolved Universal Terrestrial Radio Access (E-UTRA) Radio Resource Control (RRC); Protocol specification (Release 8)," 203 pages.

International Search Report issued in PCT/JP2010/051773, dated Mar. 23, 2010, with translation, 3 pages.

Written Opinion issued in PCT/JP2010/051773, dated Mar. 23, 2010, 3 pages.

* cited by examiner

MOBILE STATION AND MOBILE COMMUNICATION METHOD

BACKGROUND OF INVENTION

1. Technical Field

The present invention relates to a mobile station and a mobile communication method.

2. Background Art

In Release. 8 of the 3GPP, in the GSM (Global System for Mobile Communications) scheme, the UMTS (Universal Mobile Telecommunications System) scheme, or the LTE (Long Term Evolution) scheme, it is considered to apply "priority control".

In the priority control, for a purpose of dispersing a network load, a mobile station UE performs a cell selection process (Cell Reselection) based on a priority for a frequency (carrier) or a group of frequencies of each radio access network.

For example, in such priority control, "0" to "7" can be set as the above-described priority, where "7" is the highest priority, and the mobile station UE, as a camp-on cell, is configured to preferentially select a cell with a higher priority when a radio quality (RSCP or RSRP) satisfies a predetermined condition.

It is noted that the mobile station UE may acquire the priority by broadcast information in each cell, and may acquire the priority by dedicated signaling ("RRC Connection Release message" at the time of releasing an RRC connection, for example) for each mobile station UE.

In a radio access network of the existing UMTS scheme or GSM scheme, a disposition of each cell, a parameter for a cell selection process, etc., are set in order to optimize a cell selection process based on a radio quality (e.g., RSCP or Ec/N0). Therefore, as an operator, it is more desirable to perform the cell selection process that has been performed in the existing network rather than the new priority control.

That is, in the radio access network of the UMTS scheme or the radio access network of the GSM scheme, as the operation of the mobile station UE, the operator wishes to implement a cell re-selection process based on the conventional radio quality for a cell selection process (Intra-Frequency Cell Reselection) among a plurality of cells that use an identical frequency or a cell selection process (Inter-Frequency Cell Reselection) among a plurality of cells that use a different frequency; and wishes to apply the priority control for a cell selection process (Inter-RAT Cell Selection) between a cell within the radio access network of the UMTS scheme and a cell within the radio access network of the LTE scheme.

In this case, in the Release.8 of the 3GPP, in order to realize the above-described operation, in the GSM scheme or the UMTS scheme (Legacy System), when the priority for a frequency (carrier) or a group of frequencies of each radio access network is not set, it is agreed that the cell re-selection process is implemented based on the conventional radio quality.

One example of a mobile communication system for realizing the above-described operation will be explained with reference to FIG. 4 and FIG. 5.

As illustrated in FIG. 4, in the mobile communication system, a cell LTE-F0 within a radio access network of an of the LTE scheme, a cell UTRA-F1 within a radio access network of the UMTS scheme, and a cell UTRA-F2 within a radio access network of the UMTS scheme are overlaid.

In this case, the frequency used in the cell LTE-F0 is "F0", the frequency used in the cell UTRA-F1 is "F1", and the frequency used in the cell UTRA-F2 is "F2".

The broadcast information (SIB3/SIB6) in the cell LTE-F0 includes "5" as the priority of the cell LTE-F0, includes "3" as the priority of the cell UTRA-F1, and includes "3" as the priority of the cell UTRA-F2.

Further, the broadcast information (SIB19) in the cell UTRA-F1 includes "5" as the priority of the cell LTE-F0, and includes "3" as the priority of the cell UTRA-F1.

In this case, the reason why the priority of the cell UTRA-F2 is not set to the broadcast information in the cell UTRA-F1 is because a cell re-selection process based on the conventional radio quality is applied to a cell selection process between the cell UTRA-F1 and the cell UTRA-F2.

According to the present 3GPP specification, if the mobile station UE does not have any priority for a frequency different from a frequency (carrier) used in a cell within a radio access network of the UMTS scheme when the mobile station UE resides in a cell within a radio access network of the UMTS scheme, then the mobile station UE usually performs the cell re-selection process based on the conventional radio quality.

Therefore, in such an example, at the time of residing in the cell UTRA-F1, the mobile station UE does not have the priority for a frequency (frequency used in the cell UTRA-F2, for example) different from the frequency (carrier) used in the cell, in the radio access network of a UMTS scheme, and as a result, the mobile station UE performs the cell re-selection process based on the conventional radio quality.

Similarly, the broadcast information (SIB19) in the cell UTRA-F2 includes "5" as the priority of the cell LTE-F0, and includes "3" as the priority of the UTRA-F2.

As described above, in the broadcast information in all the cells, the priority of the cell LTE-F0 is highly set, and the mobile station UE is set such that it is easy to select the cell LTE-F0 as a camp-on cell.

A dual terminal compatible with the UMTS scheme and the LTE scheme such as a card-type mobile terminal that primarily performs a packet communication desirably resides in the cell within the radio access network of the LTE scheme; on the other hand, a dual terminal compatible with the UMTS scheme and the LTE scheme that primarily performs a voice communication desirably resides in the cell within a radio access network of a UMTS scheme.

This is because the LTE scheme is a mobile communication system dedicated to a packet communication and when the voice communication is concerned, it is probably used also in a mode that is offered in the UMTS scheme only. In consideration of a success rate for an origination and termination of a voice communication and the connection delay, the dual terminal that primarily performs a voice communication desirably camps on by preferentially selecting the cell within the radio access network of the UMTS scheme.

Therefore, in the broadcast information, the priority for the frequency used in the cell within the radio access network of the LTE scheme is highly set; however, it is considered that in the dual terminal compatible with the UMTS scheme and the LTE scheme that primarily performs a voice communication, the priority for the frequency used in the cell within a radio access network of the UMTS scheme is highly set by way of the dedicated signaling (RRC Connection Release message, etc.).

However, in such a case, the following problems occur. Such problems will be explained with reference to FIG. 5.

As illustrated in FIG. 5, the radio base station eNB notifies, to the mobile station UE (dual terminal compatible with the UMTS scheme and the LTE scheme) that is in communication in the radio access network of the LTE scheme, by way of the dedicated signaling, the priority "4" of the cell LTE-F0 and the priority "6" of the cell UTRA-F1, and instructs the mobile station UE to perform "Redirect" to the cell UTRA-F1.

As a result, in the mobile station UE, the priority "6" of the cell UTRA-F1 becomes higher than the priority "4" of the cell LTE-F0, and then, the mobile station UE starts camping on the cell UTRA-F1.

In step S2002, the mobile station UE performs the cell re-selection process based on the conventional radio quality between the cell UTRA-F1 and the cell UTRA-F2.

According to the present 3GPP specification, if the mobile station UE does not have any priority for a frequency different from a frequency used in a cell within a radio access network of the UMTS scheme when the mobile station UE resides in a cell within a radio access network of the UTRA scheme, then the mobile station UE usually performs the cell re-selection process based on the conventional radio quality.

In such an example, at the time of residing in the cell UTRA-F1, the mobile station UE does not have the priority for the frequency (frequency used in the cell UTRA-F2, for example) different from the frequency (carrier) used in the cell, within the radio access network of the UMTS scheme, and as a result, the mobile station UE performs the cell re-selection process based on the conventional radio quality.

When this results in the radio quality in the cell UTRA-F2 being superior to the radio quality in the cell UTRA-F1, the mobile station UE starts camping on the cell UTRA-F2 according to the cell re-selection process based on the conventional radio quality.

In step S2003, in the mobile station UE, if residing in the cell UTRA-F2 to which no priority is set according to the specification of the present 3GPP, then the lowest priority "−1" (priority smaller than the settable priority "0") is automatically applied to the cell UTRA-F2.

In step S2004, the mobile station UE performs the above-described priority control between the cell LTE-F0 and the cell UTRA-F2. As a result, the priority "4" of the cell LTE-F0 is higher than the priority "−1" of the cell UTRA-F2, and thus, the mobile station UE starts camping on the cell LTE-F0 according to the above-described priority control.

Then, in step S2005, the priority "6" of the cell UTRA-F1 is higher than the priority "4" of the cell LTE-F0, and thus, the mobile station UE starts camping on the cell UTRA-F1.

Thereafter, in step S2006, again, the radio quality in the cell UTRA-F2 is superior to the radio quality in the cell UTRA-F1, and thus, the mobile station UE starts camping on the cell UTRA-F2.

Thus, a phenomenon in which the camp-on cell of the mobile station UE is repeatedly changed from the cell LTE-F0 to the cell UTRA-F1 to the cell UTRA-F2 to the cell LTE-F0 to . . . occurs.

SUMMARY OF INVENTION

Therefore, the present invention is intended to overcome the above-described problem. An object of the present invention is to provide a mobile station and a mobile communication method, capable of preventing the generation of a phenomenon in which the camp-on cell of a mobile station UE is repeatedly changed.

A first aspect of the present invention is summarized as a mobile station including: a dedicated signaling reception unit configured to receive a dedicated signaling including a priority for a frequency (carrier) or a group of frequencies of each radio access network; and a camp-on processing unit configured to select a camp-on cell based on the priority or a radio quality in each cell, wherein when a predetermined flag is set to the dedicated signaling received by the dedicated signaling reception unit, the camp-on processing unit is configured to select the camp-on cell based on the radio quality in each cell, from a plurality of cells that use a different frequency but reside within an identical radio access network, and to select the camp-on cell based on the priority included in the dedicated signaling, from a plurality of cells within a different radio access network.

A second aspect of the present invention is summarized as a mobile communication method, including the steps of: (A) transmitting, from a radio base station to a mobile station, a dedicated signaling including a priority for a frequency (carrier) or a group of frequencies of each radio access network; and (B) selecting, at the mobile station, the camp-on cell based on the priority or a radio quality in each cell, wherein in the step (B), when a predetermined flag is set to the received dedicated signaling, the mobile station selects the camp-on cell based on the radio quality in each cell, from a plurality of cells that use a different frequency but reside within an identical radio access network and selects the camp-on cell based on the priority included in the dedicated signaling, from a plurality of cells within a different radio access network.

As explained above, according to the present invention, it is possible to provide a mobile station and a mobile communication method, capable of preventing the generation of a phenomenon in which the camp-on cell of a mobile station UE is repeatedly changed.

DETAILED DESCRIPTION (Mobile Communication System According to First Embodiment of the Present Invention)

With reference to FIG. 1 to FIG. 4, a mobile communication system according to a first embodiment of the present invention will be explained.

Figure 4:
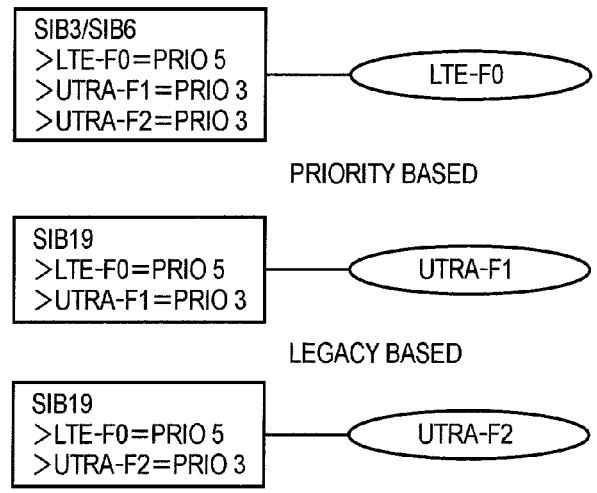
FIG. 4 is a diagram explaining a conventional mobile communication system.
Figure 5:
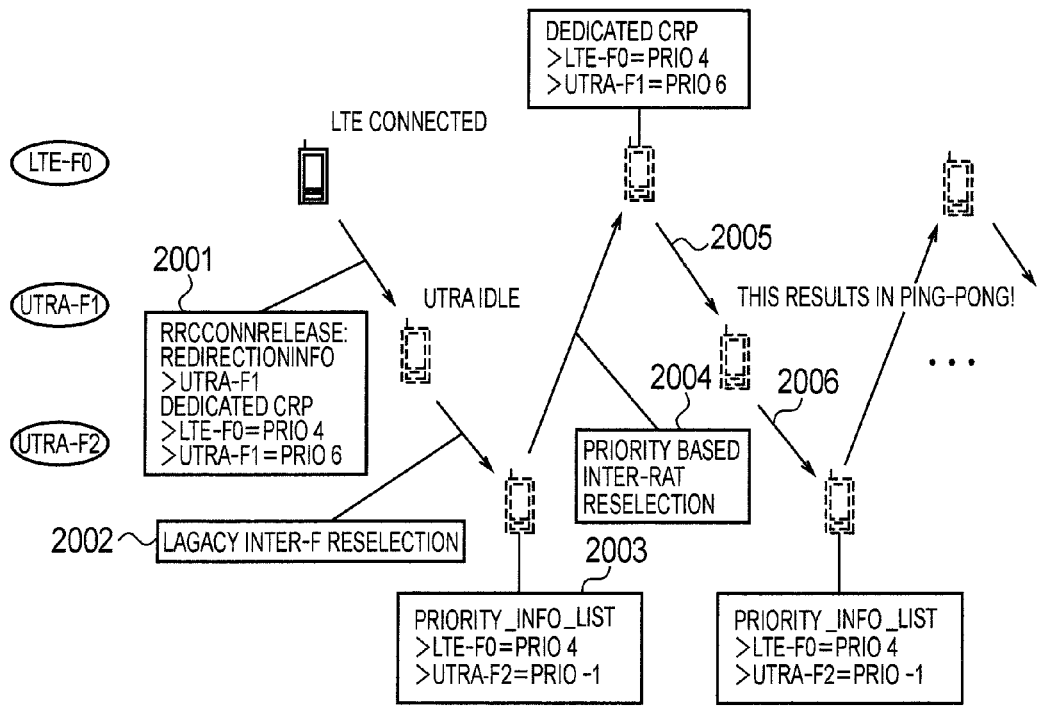
FIG. 5 is a diagram explaining a conventional mobile communication system.

As illustrated in FIG. 4, in the mobile communication system, a cell LTE-F0 within a radio access network of the LTE scheme, a cell UTRA-F1 within a radio access network of the UMTS scheme, and a cell UTRA-F2 within a radio access network of the UMTS scheme are overlaid.

In this case, the frequency used in the cell LTE-F0 is "F0", that used in the cell UTRA-F1 is "F1", and that used in the cell UTRA-F2 is "F2".

The broadcast information (SIB3/SIB6) in the cell LTE-F0 includes "5" as the priority of the cell LTE-F0, includes "3" as the priority of the cell UTRA-F1, and includes "3" as the priority of the cell UTRA-F2.

Further, the broadcast information (SIB19) in the cell UTRA-F1 includes "5" as the priority of the cell LTE-F0, and includes "3" as the priority of the cell UTRA-F1.

Similarly, the broadcast information (SIB19) in the cell UTRA-F2 includes "5" as the priority of the cell LTE-F0, and includes "3" as the priority of the cell UTRA-F2.

Figure 1:
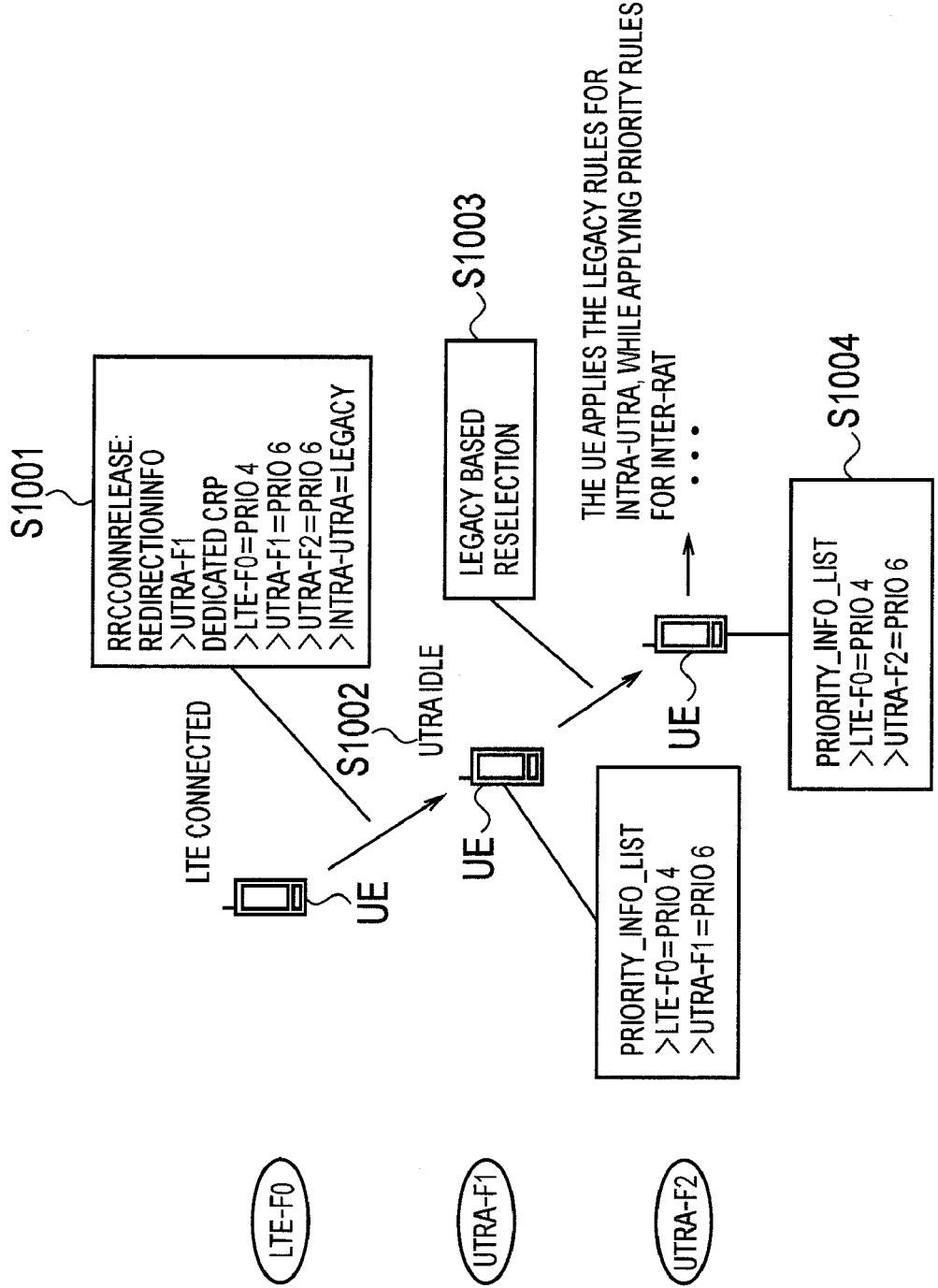
FIG. 1 is a diagram explaining a mobile communication system according to a first embodiment of the present invention.

As illustrated in FIG. 1, in step S1001, the radio base station eNB notifies, to the mobile station UE (dual terminal compatible with the UMTS scheme and the LTE scheme) that is in communication in the radio access network of the LTE scheme, by way of a dedicated signaling ("RRC Connection Release message", for example) of the priority "4" of the cell LTE-F0, the priority "6" of the cell UTRA-F1, and the priority "6" of the cell UTRA-F2, and instructs the mobile station UE to perform "Redirect" to the cell UTRA-F1.

In this case, a predetermined flag "Legacy Cell Reselection Flag (intra-UTRA=Legacy)" is set to such a dedicated signaling ("RRC Connection Release message", for example).

When "Legacy Cell Reselection Flag" is set, even if the priority is set between different frequencies within an identical radio access network, the mobile station UE implements the cell re-selection process based on the conventional radio quality without implementing the priority control.

As a result, in the mobile station UE, the priority "6" of the cell UTRA-F1 becomes higher than the priority "4" of the cell LTE-F0, and in step S1002, the mobile station UE starts camping on the cell UTRA-F1.

In step S1003, the mobile station UE performs the cell re-selection process based on the conventional radio quality between the cell UTRA-F1 and the cell UTRA-F2. When this results in the radio quality in the cell UTRA-F2 becoming superior to the radio quality in the cell UTRA-F1, the mobile station UE starts camping on the cell UTRA-F2 according to the cell re-selection process based on the conventional radio quality.

In step S1004, the mobile station UE performs the above-described priority control between the cell LTE-F0 and the cell UTRA-F2. As a result, the priority "4" of the cell LTE-F0 is lower than the priority "6" of the cell UTRA-F2, and thus, the mobile station UE continues the camping on the cell UTRA-F2 without starting camping on the cell LTE-F0 according to the above-described priority control.

As a result, it is possible to prevent the generation of a phenomenon in which the camp-on cell of the mobile station UE, which occurs in the conventional mobile communication system, is repeatedly changed.

Figure 2:
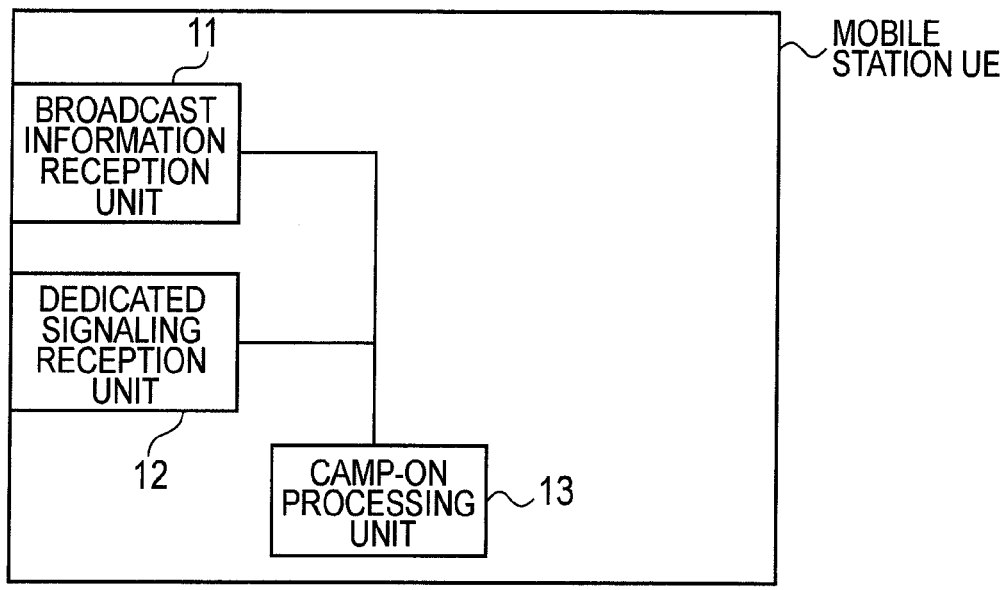
FIG. 2 is a functional block diagram of a mobile station according to the first embodiment of the present invention.
Figure 3:
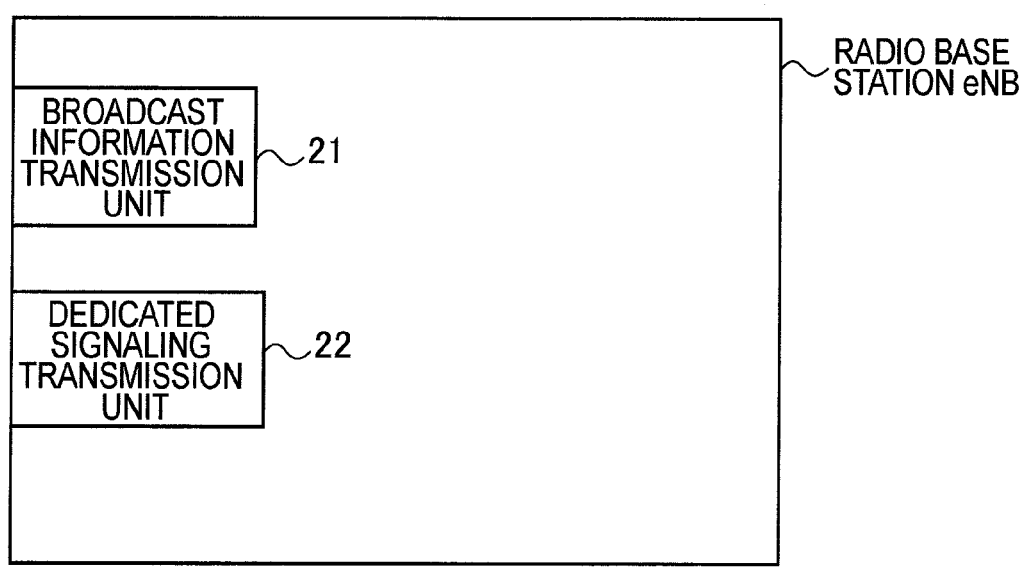
FIG. 3 is a functional block diagram of a radio base station according to the first embodiment of the present invention.

As illustrated in FIG. 2, the mobile station UE configuring such a mobile communication system includes a broadcast information reception unit 11, a dedicated signaling reception unit 12, and a camp-on processing unit 13.

The broadcast information reception unit 11 is configured to receive the broadcast information in each cell.

The dedicated signaling reception unit 12 is configured to receive a dedicated signaling for mobile station UE, including a priority for a frequency (carrier) or a group of frequencies of each radio access network.

The camp-on processing unit 13 is configured to select the camp-on cell based on the priority or the radio quality in each cell.

For example, the camp-on processing unit 13 is configured to select the camp-on cell based on the radio quality in each cell, from a plurality of cells (in an example of FIG. 1, the cell UTRA-F1 and the cell UTRA-F2) that use a different frequency but reside within an identical radio access network, and to select the camp-on cell based on the priority included in the dedicated signaling from a plurality of cells (in the example of FIG. 1, the cell LTE-F0 and the cell UTRA-F2) within a different radio access network, when a predetermined flag "Legacy Cell Reselection Flag (intra-UTRA=Legacy)" is set to the dedicated signaling received by the dedicated signaling reception unit 12.

Further, the camp-on processing unit 13 may be configured to select the camp-on cell based on the priority included in the dedicated signaling, from a plurality of cells (in the example of FIG. 1, the cell UTRA-F1 and the cell UTRA-F2) that use a different frequency but reside within an identical radio access network, when the predetermined flag "Legacy Cell Reselection Flag (intra-UTRA=Legacy)" is not set to the dedicated signaling received by the dedicated signaling reception unit 12.

In this case, not only "intra-UTRA=Legacy" but also "intra-GSM=Legacy" may be set to the predetermined flag "Legacy Cell Reselection Flag".

The above-mentioned aspects of the embodiment may be expressed as follows:

A first aspect of the present embodiment is summarized as a mobile station UE including: a dedicated signaling reception unit 12 configured to receive a dedicated signaling including a priority for a frequency or a group of frequencies of each radio access network; and a camp-on processing unit 13 configured to select a camp-on cell based on the priority or a radio quality in each cell; wherein when a predetermined flag "Legacy Cell Reselection Flag" is set to the dedicated signaling received by the dedicated signaling reception unit 12, the camp-on processing unit 13 is configured to select the camp-on cell based on the radio quality in each cell, from a plurality of cells that use a different frequency but reside within the identical radio access network, and to select the camp-on cell based on the priority included in the dedicated signaling, from a plurality of cells within the different radio access network.

In the first aspect of this embodiment, when the predetermined flag "Legacy Cell Reselection Flag" is not set to the dedicated signaling received by the dedicated signaling reception unit 12, the camp-on processing unit 13 may be configured to select the camp-on cell based on the priority included in the dedicated signaling from a plurality of cells that use the different frequency but reside within the identical radio access network.

In the first aspect of this embodiment, the dedicated signaling may be an RRC connection release signal "RRC Connection Release message".

In the first aspect of this embodiment, the predetermined flag "Legacy Cell Reselection Flag" may be set for each radio access network (a radio access network of the UMTS scheme or the GSM scheme, for example).

In the first aspect of this embodiment, the predetermined flag "Legacy Cell Reselection Flag" may be set commonly to all the radio access networks, e.g., a radio access network of the UMTS scheme or the GSM scheme).

A second aspect of the present embodiment is summarized as a mobile communication method including the steps of: (A) transmitting, from a radio base station eNB/NodeB to a mobile station UE, a dedicated signaling including a priority for a frequency or a group of frequencies of each radio access network; and (B) selecting, at the mobile station UE, a camp-on cell based on the priority or a radio quality in each cell; wherein in the step (B), when the predetermined flag "Legacy Cell Reselection Flag" is set to the received dedicated signaling, the mobile station UE selects the camp-on cell based on the radio quality in each cell from a plurality of cells that use a different frequency but reside in an identical radio access network, and selects the camp-on cell based on the priority included in the dedicated signaling from a plurality of cells within a different radio access network.

In the second aspect of this embodiment, in the step (B), when the predetermined flag "Legacy Cell Reselection Flag" is not set to the received dedicated signaling, the mobile station UE may select the camp-on cell based on the priority included in the dedicated signaling from a plurality of cells that use a different frequency but reside within an identical radio access network.

In the second aspect of this embodiment, the dedicated signaling may be an RRC connection release signal "RRC Connection Release message".

In the second aspect of this embodiment, the predetermined flag "Legacy Cell Reselection Flag" may be set for each radio access network, e.g., a radio access network of the UMTS scheme or the GSM scheme.

In the second aspect of this embodiment, the predetermined flag "Legacy Cell Reselection Flag" may be set commonly to all the radio access networks, e.g., a radio access network of the UMTS scheme or the GSM scheme.

The operation of the above-described radio base station eNB and the mobile station UE may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the radio base station eNB and the mobile station UE. As a discrete component, such a storing medium and processor may be arranged in the radio base station eNB and the mobile station UE.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile station comprising:
    a dedicated signaling reception unit configured to receive a dedicated signaling including a priority for a frequency or a group of frequencies of each radio access network; and
    a camp-on processing unit configured to select a camp-on cell based on the priority or a radio quality in each cell, wherein when a predetermined flag is set to the dedicated signaling received by the dedicated signaling reception unit, the camp-on processing unit is configured to select the camp-on cell based on the radio quality in each cell, from a plurality of cells that use a different frequency but reside within an identical radio access network, and to select the camp-on cell based on the priority included in the dedicated signaling, from a plurality of cells within a different radio access network;
    wherein when the predetermined flag is not set to the dedicated signaling received by the dedicated signaling reception unit, the camp-on processing unit is configured to select the camp-on cell based on the priority included in the dedicated signaling, from a plurality of cells that use a different frequency but reside within an identical radio access network.

2. The mobile station according to claim 1, wherein the dedicated signaling is an RRC connection release signal.

3. The mobile station according to claim 1, wherein the predetermined flag is set for each radio access network.

4. The mobile station according to claim 1, wherein the predetermined flag is set commonly to all the radio access networks.

5. A mobile communication method, comprising the steps of:
    (A) transmitting, from a radio base station to a mobile station, a dedicated signaling including a priority for a frequency or a group of frequencies of each radio access network; and
    (B) selecting, at the mobile station, the camp-on cell based on the priority or a radio quality in each cell, wherein in the step (B), when a predetermined flag is set to the received dedicated signaling, the mobile station selects the camp-on cell based on the radio quality in each cell, from a plurality of cells that use a different frequency but reside within an identical radio access network and selects the camp-on cell based on the priority included in the dedicated signaling, from a plurality of cells within a different radio access network;
    wherein in the step (B), when the predetermined flag is not set to the received dedicated signaling, the mobile station selects the camp-on cell based on the priority included in the dedicated signaling, from a plurality of cells that use a different frequency but reside within an identical radio access network.

6. The mobile communication method according to claim 5, wherein the dedicated signaling is an RRC connection release signal.

7. The mobile communication method according to claim 5, wherein the predetermined flag is set for each radio access network.

8. The mobile communication method according to claim 5, wherein the predetermined flag is set commonly to all the radio access networks.

9. The mobile station according to claim 1, wherein the dedicated signaling is an RRC connection release signal.

10. The mobile station according to claim 1, wherein the predetermined flag is set for each radio access network.

11. The mobile station according to claim 1, wherein the predetermined flag is set commonly to all the radio access networks.

12. The mobile station according to claim 2, wherein the predetermined flag is set for each radio access network.

13. The mobile station according to claim 2, wherein the predetermined flag is set commonly to all the radio access networks.

14. The mobile communication method according to claim 5, wherein the dedicated signaling is an RRC connection release signal.

15. The mobile communication method according to claim 5, wherein the predetermined flag is set for each radio access network.

16. The mobile communication method according to claim 5, wherein the predetermined flag is set commonly to all the radio access networks.

17. The mobile communication method according to claim 6, wherein the predetermined flag is set for each radio access network.

18. The mobile communication method according to claim 6, wherein the predetermined flag is set commonly to all the radio access networks.

* * * * *